United States Patent [19]

Gray

[11] Patent Number: 5,484,001
[45] Date of Patent: Jan. 16, 1996

[54] METHOD FOR APPLICATION OF SMOKE COLOR TO INSIDE OF BAG AND APPARATUS THEREFOR

[75] Inventor: Stephen L. Gray, Moore, S.C.

[73] Assignee: W. R. Grace & Co.-Conn, Duncan, S.C.

[21] Appl. No.: 77,467

[22] Filed: Jun. 15, 1993

[51] Int. Cl.⁶ .................................. A22C 11/02
[52] U.S. Cl. .................... 141/114; 141/69; 141/313; 99/534; 426/410; 426/415; 452/27
[58] Field of Search ................ 141/10, 114, 9, 141/11, 12, 69, 71, 73, 80, 100, 104, 313–317; 452/30, 32, 35, 37, 38, 45, 27; 53/526, 527; 426/112, 129, 394, 410, 413–415; 99/482, 494, 516, 534

[56] References Cited

U.S. PATENT DOCUMENTS

| | | | |
|---|---|---|---|
| 1,649,362 | 11/1927 | Nagel | 141/12 |
| 3,038,198 | 6/1962 | Schaar | 18/1 |
| 3,563,764 | 2/1971 | Posegate | 99/107 |
| 3,673,041 | 6/1972 | Schulz | 156/306 |
| 3,703,604 | 11/1972 | Lugiewicz | 53/122 |
| 3,740,921 | 6/1973 | Meyer | 53/112 |
| 3,760,556 | 9/1973 | Morris | 53/122 |
| 3,853,999 | 12/1974 | Kentor | 426/105 |
| 3,928,938 | 12/1974 | Burrell | 53/22 |
| 3,950,919 | 4/1976 | Perdue | 53/22 |
| 4,132,048 | 1/1979 | Day | 53/434 |
| 4,251,976 | 2/1981 | Zanni | 53/433 |
| 4,411,919 | 10/1983 | Thompson | 426/412 |
| 4,469,742 | 9/1984 | Oberle et al. | 428/215 |
| 4,586,320 | 5/1986 | Takai et al. | 53/512 |
| 4,606,922 | 8/1986 | Schirmer | 426/412 |
| 4,672,793 | 6/1987 | Terlizzi, Jr. et al. | 53/434 |
| 4,721,623 | 1/1988 | Coffey et al. | 426/250 |
| 4,842,028 | 6/1989 | Kaufman et al. | 141/114 |
| 4,855,183 | 8/1989 | Oberle | 428/345 |
| 4,879,124 | 11/1989 | Oberle | 426/113 |
| 4,949,430 | 8/1990 | Stanek | 99/494 |
| 4,958,412 | 9/1990 | Stanek | 99/494 |
| 5,215,215 | 6/1993 | Sauer | 141/114 X |

FOREIGN PATENT DOCUMENTS

| | | | |
|---|---|---|---|
| 2451334 | 11/1980 | France | 141/114 |
| 4327114 | 11/1992 | Japan | 141/114 |
| 1516498 | 7/1978 | United Kingdom . | |

*Primary Examiner*—J. Casimer Jacyna
*Attorney, Agent, or Firm*—Rupert B. Hurley, Jr.; Mark B. Quatt

[57] ABSTRACT

A method of packaging meat emulsion in a flexible thermoplastic bag, wherein the bag has dispersed on its insides, prior to insertion of the meat emulsion into the bag, additives such as liquid colorant or liquid smoke, via a squeeze roller and backing plate (or two squeeze rollers), is shown. An apparatus for dispersing the additives via a squeeze roller and backing plate (or two squeeze rollers) is also shown.

2 Claims, 3 Drawing Sheets

METHOD FOR APPLICATION OF SMOKE COLOR TO INSIDE OF BAG AND APPARATUS THEREFOR

BACKGROUND OF THE INVENTION

1. Field of the Invention

The invention disclosed herein relates to the packaging of comminuted meat pieces, commonly referred to as meat emulsion, and more particularly to vacuum packaging of discrete pieces of meat, such as sausage or luncheon meats. Even more particularly, the invention relates to the introduction of liquid smoke, colorant or other similar additives. Typically, the bag is of a flexible thermoplastic material, and the bag is oriented, i.e. heat-shrinkable, as the resultant packaged product is often intended for cook-in, during which the bag material shrinks about the product for a tight fit. The bag of cooked meat is then sold in retail stores.

2. Description of Related Art

It is well known in the food packaging art to stuff thermoplastic bags with various meat products. These products are typically processed and introduced in the form of an emulsion or comminuted form. It is also common practice to introduce liquid smoke, colorant, or other similar additives to certain processed meat products such as sausage or luncheon meats to impart the desired flavor or color to the food product. These additives are usually blended into the food product before the stuffing operation, or impregnated into the bag material itself if the composition of the bag material permits impregnation of such additives. These general practices require an additional step, either during comminutation of the meat or manufacture of the plastic material for the bag, prior to the operation of stuffing the meat into the bag. In the instance of pre-blending the colorant or liquid smoke into the food product, sometimes more additive is used than is really required. For example, if only the surface of the food product requires the colorant or liquid smoke, pre-blending uses excess additive which is blended throughout the food product. Additionally, in the instance of some synthetic thermoplastic materials used in manufacturing the bags, liquid smoke and colorant are not easily added to the polymeric resin itself during the extrusion of this resin into plastic sheet for the bag, and if added are not readily retained by the bag material.

For these reasons, it is desirable to provide a method and apparatus for coating the interior of a bag, which does not require the pre-blending of the additive before the stuffing operation, or the impregnation of the bag material itself with the additive.

Many apparatus for the vacuum stuffing or packaging of meat into a bag are well known. One is the Belam vacuum meat press marketed by Belam, Inc., Oakbrook, Ill. Many patents disclose such vacuum stuffing and/or packaging apparatuses, for example U.S. Pat. Nos. 3,563,764, 3,703,064, 3,760,556, 3,853,999, 3,928,938, 3,950,919, 4,132,048, 4,251,976, 4,586,320, 4,672,793, 3,673,041, and 3,740,921, and U.K. Published Patent Specification No. 1,516,498. Some of these are specific to how to close the bag. U.S. Pat. No. 3,673,041 shows the bag closure means of a vacuum packaging apparatus wherein the bag closure is accomplished by heat sealing with a heat seal bar. U.S. Pat. No. 3,740,921 shows the bag closure means of a vacuum packaging apparatus wherein the bag closure is accomplished by clipping the bag neck with a clipper. U.S. Pat. No. 4,586,320, describes the Furukawa 8150 vacuum meat stuffing apparatus. In particular one of these patents, namely U.S. Pat. No. 3,673,041, is directed to a special heat seal bar for squeezing contaminants such as fatty substances out of the sealing area before the bag panels are fused together to close the bag open neck, and in those instances where solid particulate contaminants are found in the sealing area of the bag neck utilizing steam flushing to clean the inside surfaces of the bag neck area prior to sealing. The disclosures of all of these patents are incorporated herein by reference.

U.S. Pat. No. 4,721,623 (Coffey and Suess, assignors to Oscar Mayer Foods) involves atomized spraying of an aqueous solution of caramel coloring in a humid environment about the surface of a meat product. U.S. Pat. No. 4,958,412 (Stanek, assignor to Grace) involves a sleeve on a stuffing horn wherein the sleeve has grooves for transmitting a liquid additive onto the interior of the plastic. U.S. Pat. No. 4,949,430 (Stanek, assignor to Grace) involves a sleeve on a stuffing horn wherein the sleeve has atomizers for transferring a liquid additive onto the interior of a food-product thermoplastic container. The disclosures of these three patents are also incorporated herein by reference.

The package of meat can be frozen or refrigerated for storage. Either before or after storage, the package can be subjected to cook-in. Cook-in is a long slow process, typically about 1 to 4 hours, and can be up to 12 hours, at a temperature typically of about 160° F. (71° C.) to 200° F. (93° C.) and can be from about 131° F. (55° C.) to 212° F. (100° C.). Cook-in films are described in U.S. Pat. Nos. 4,411,919, 4,606,922, 4,469,742, 4,855,183, and 4,879,124. In particular, when the meat is turkey, for certain cook-in applications, the bags are perforated, and this is shown in the last-mentioned patent, namely U.S. Pat. No. 4,879,124. An apparatus for making the perforations is described in U.S. Pat. No. 3,038,198. The disclosures of all of these patents are also incorporated herein by reference.

OBJECTS OF THE INVENTION

It is an object of the present invention to provide an improved method for the packaging of comminuted meat, wherein it is desired to introduce liquid smoke, colorant, or other similar additives to impart a desired flavor or color to the meat product.

It is another object of the invention to facilitate packaging of comminuted meat when such additives are desired.

It is an advantage of the present invention that there is avoided the pre-blending of the additive into the meat before the stuffing operation, or the impregnation of the plastic material itself with the additive.

It is another object of the present invention to provide an apparatus for providing additives to a bag inside for when a bag is stuffed with comminuted meat.

SUMMARY OF THE INVENTION

Therefore, the present invention provides a method to package discrete pieces of meat with liquid additive in a flexible thermoplastic container, said method comprising: (a) providing a bag comprising a flexible thermoplastic container having an inside, an outside, an open neck end, a closed bottom end, and opposing bag panels, said container being vertically disposed with its open neck end beneath a stuffing horn; (b) delivering a liquid additive through a delivery means into said container, said delivery means being attached to said stuffing horn; (c) bringing together a squeeze roller and a backing plate whereby said container opposing bag panels are vertically held between said squeeze roller and said backing plate, said squeeze roller and said backing plate being disposed at said closed bottom end; (d) moving said squeeze roller upwardly along the container outside thereby dispersing the liquid additive along the container inside to a desired level in the container, and then bringing said squeeze roller apart from said backing plate; (e) stuffing through the open neck end of the thermoplastic container via the stuffing horn with a comminuted meat product such that the liquid additive on the inside of the thermoplastic container contacts the meat product; and (f) closing the open neck end of the container.

The present invention also provides an apparatus for providing liquid additives to a flexible, thermoplastic container inside during stuffing of said container with comminuted meat via a stuffing machine, said apparatus comprising (a) a squeeze roller and a backing plate disposed with respect to said stuffing machine such that the squeeze roller may be brought together with the backing plate at a thermoplastic container bottom, the squeeze roller moved upwardly along the container outside, and then said squeeze roller being brought apart from said backing plate, (b) a liquid delivery means attached to said stuffing machine for delivering liquid additive to said container inside, (c) whereby after said liquid additive is delivered to said container inside, said squeeze roller and said backing plate are brought together at said container bottom, said squeeze roller is moved upwardly along said container outside, and then brought apart from said backing plate, thereby dispersing said liquid additive along the inside of the container to a desired level.

Alternatively, in the method or the apparatus, instead of a squeeze roller and a backing plate, there could be used a pair of squeeze rollers. But then that pair should be well matched in size and well matched in speed so that as the pair of rollers are moved upwardly along the two outside bag panels to disperse the liquid additive along the container inside, the rollers move in sychronization. Thus, it is preferred that a squeeze roller with a backing plate be used. The invention is further discussed herein with reference to this preferred embodiment, with the understanding that two squeeze rollers could instead be used.

DESCRIPTION OF THE PREFERRED EMBODIMENTS

It is preferred that a squeeze roller with a backing plate be used. The invention is further discussed herein with reference to this preferred embodiment, with the understanding that two squeeze rollers could instead be used. The two squeeze rollers are not illustrated here.

Figure 1:
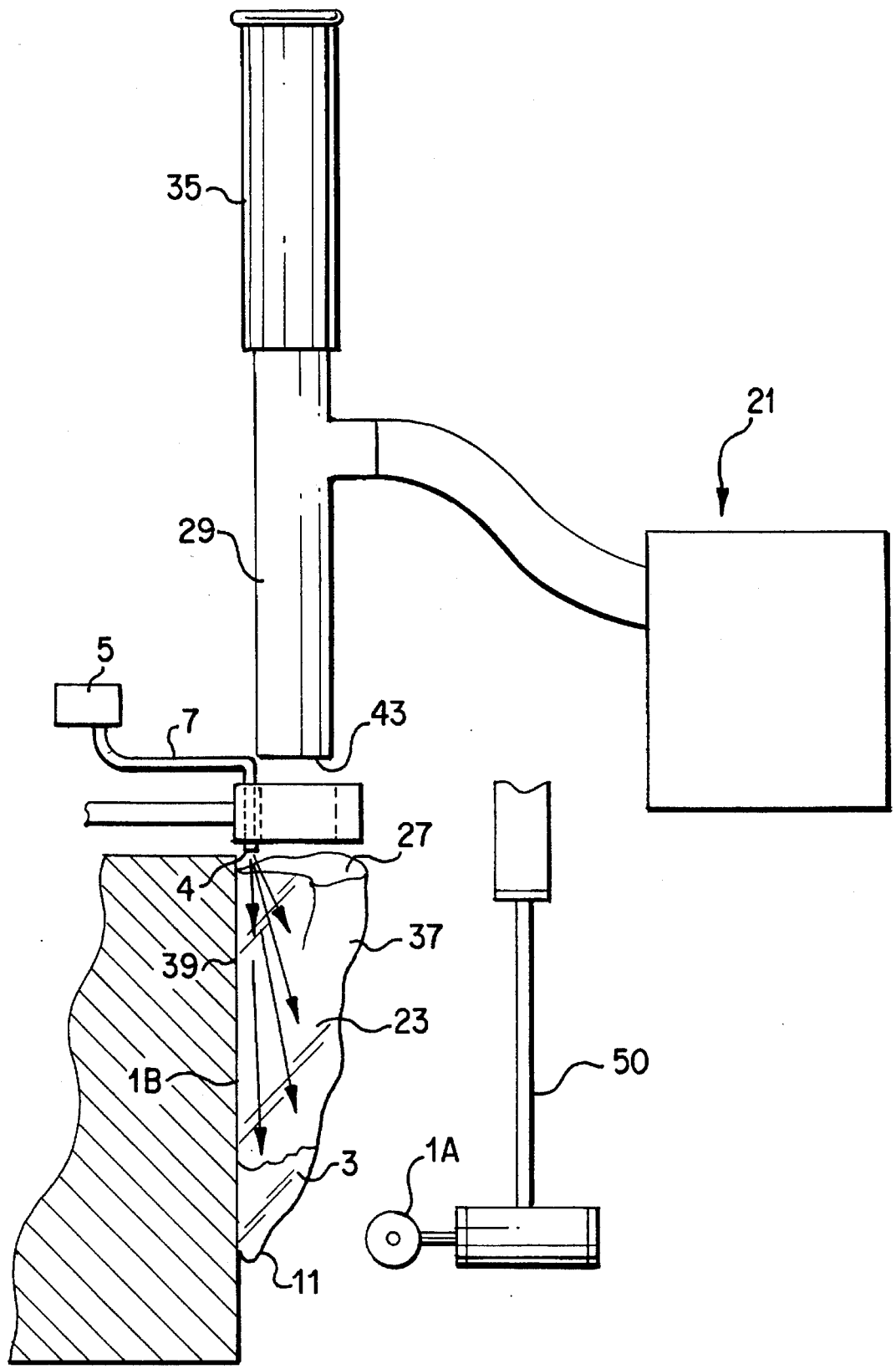
FIG. 1 is a schematic view showing a vacuum stuffing apparatus 21, a bag 23, and a squeeze roller 1A and a backing plate 1B, disposed at the closed bottom end 11 of the bag 23.

In FIG. 1 is shown schematically vacuum stuffing apparatus 21 and bag 23. The bag may be of heat-shrinkable material or non-heat-shrinkable material. Also, the bag material may be mono-layer or multilayer (layers not illustrated here). Bag 23 preferably is a multilayer flexible thermoplastic material and is shown vertically disposed with its open mouth neck end 27 directed upwards and underneath discharge end 43 of the stuffing horn 29 portion of vacuum stuffer apparatus 21. Bag 23 is shown containing liquid additive 3. Liquid additive 3 has been dispersed from additive container 5 through flexible hose 7 attached to dispersing nozzle 9 disposed near the open discharge end 43 of the stuffing horn 29. The liquid 3 is dispersed into the bay 23 via open neck 27 and then the roller 1A and backing plate 1B are brought together via a hydraulic lever arm schematically shown as 50, at the bag closed bottom end 11.

Figure 2:
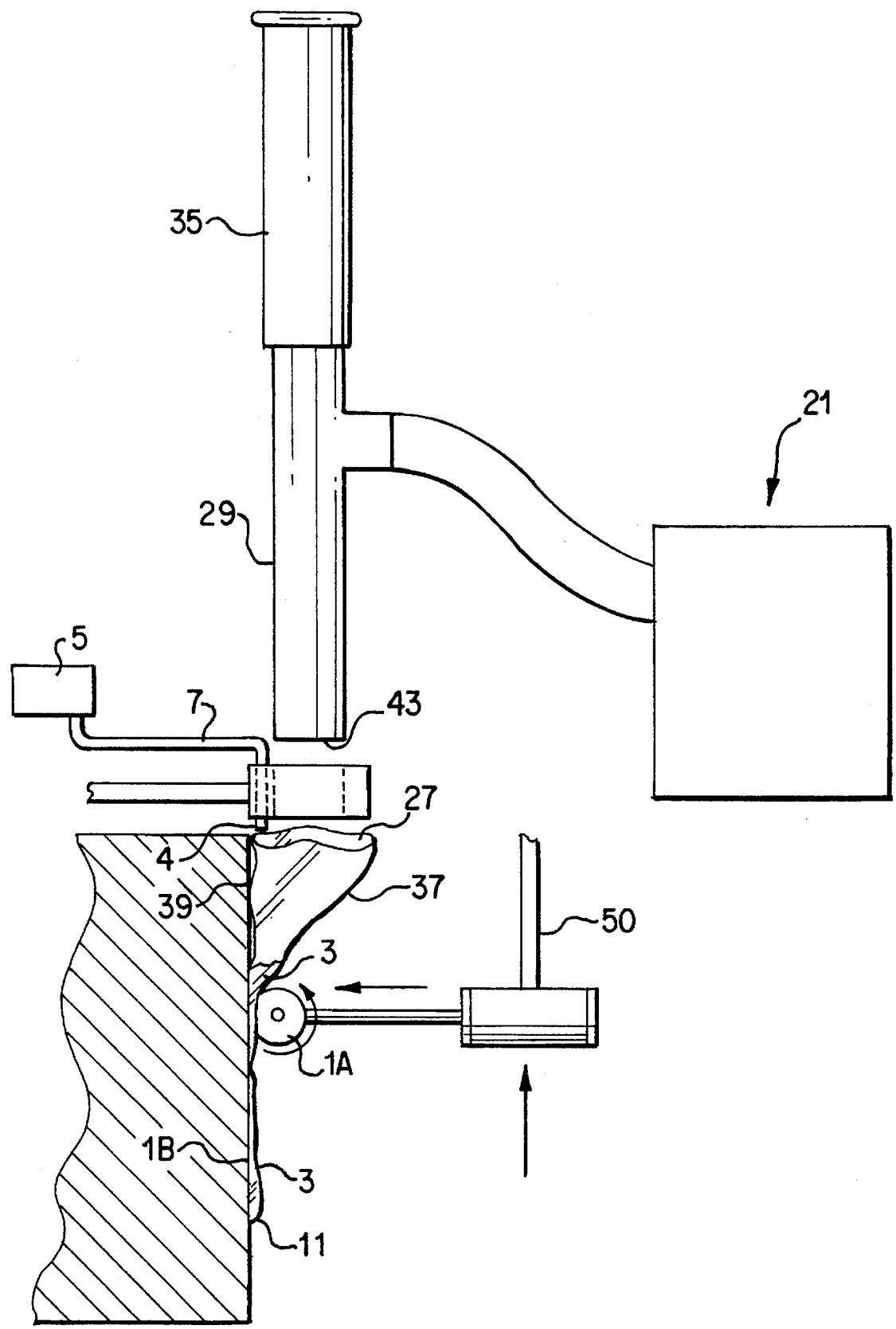
FIG. 2 is a schematic view like FIG. 1, but in FIG. 2 the squeeze roller 1A and backing plate 1B are shown with the squeeze roller disposed in an upward position on a bag panel on the outside of the bag 23.

Next, in FIG. 2, roller 1A is shown in an upward position holding outsides of panels 37,39 of the bag container together and against backing plate 1B. This occurs after roller 1A is moved by arm 50 toward plate 1B and squeeze roller 1A is rolled upward along the outside of bag 23 with bag panels 37,39 disposed between roller 1A and plate 1b to disperse liquid additive 3 along the insides of bag panels 37,39 of bag 23 by causing panels 37,39 to press together with their insides touching as the panels are held against plate 1B.

Figure 3:
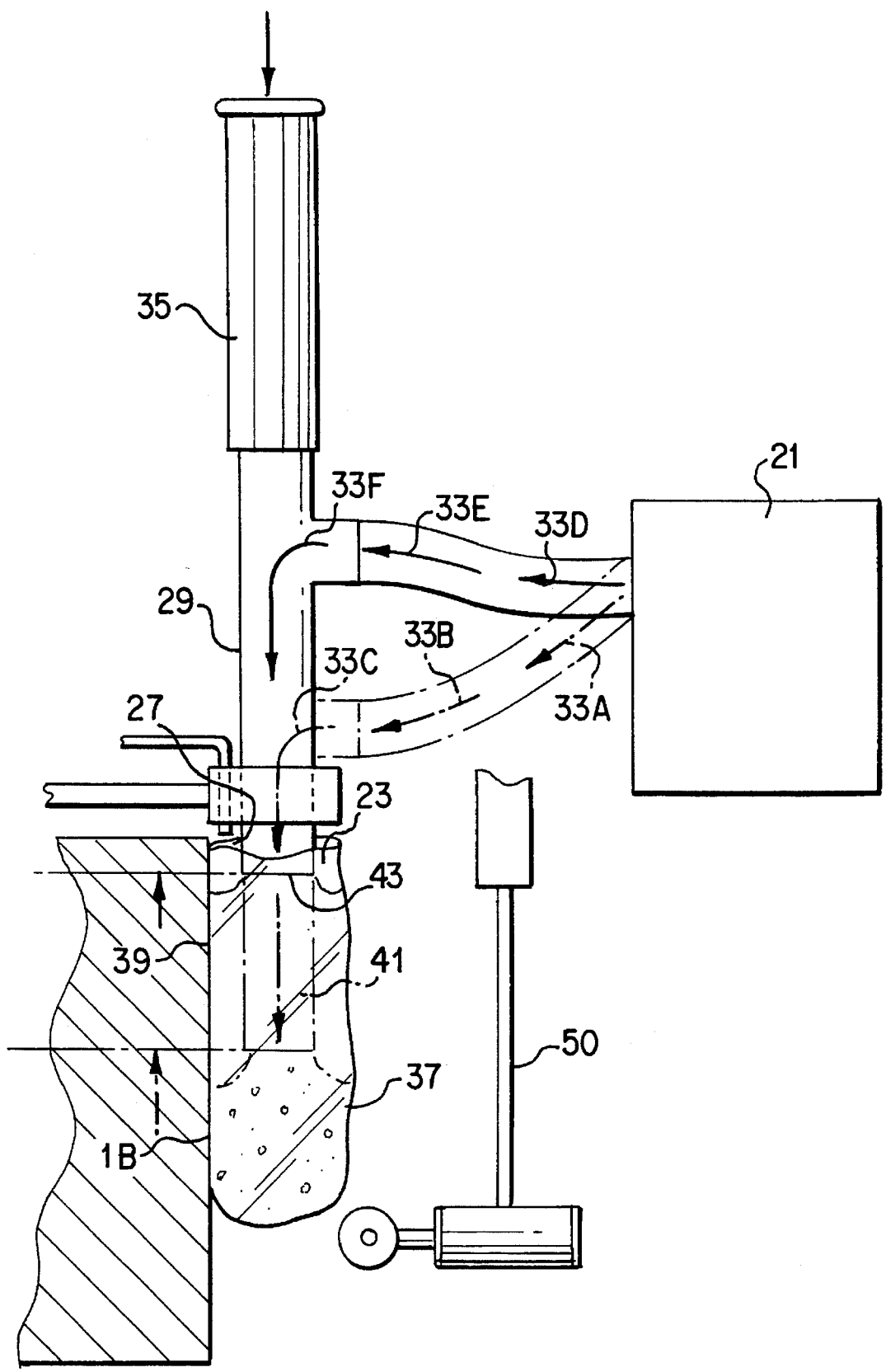
FIG. 3 is a schematic view showing after the squeeze roller and backing plate have dispersed the liquid additive 3 along the inside of bag 23, then stuffing horn 29 is brought down into the bag open mouth neck end 27 to disperse comminuted meat into the bag.

Next, roller 1A is moved out and away from bag 23 and backing plate 1B via the hydraulic lever arm 50, as shown in FIG. 3. Then stuffing horn 29 portion of vacuum stuffing apparatus 21 is brought down vertically into the open mouth end 27 of bag 23, as bag 23 is shown vertically disposed with its open mouth end 27 directed upwards and disposed about discharge end 43. Stuffing horn 29 is lowered, as shown in FIG. 3, so that it is in its lowered position inside bag 23 between bag panel 39 and bag panel 37. Via flex hose 31, discrete pieces of comminuted meat product 41 are pushed from apparatus 21 in the direction of product flow arrows 33a, 33b, 33c, 33d, 33e, and 33f into bag 23. Clean out piston 35 moves up and down to help push the discrete pieces of meat product 41 out of stuffing horn 29 and into bag 23. Stuffing horn 29 retracts during the stuffing process (not illustrated here). After stuffing, the bag mouth end may be clipped closed or heat sealed closed (not illustrated here).

While certain representative embodiments and details have been shown for the purpose of illustration, numerous modifications to the invention described above can be made without departing from the invention disclosed.

What is claimed is:

1. An apparatus, in a stuffing machine, for providing liquid additives to a flexible, thermoplastic container during stuffing of said container with comminuted meat, said apparatus comprising:

(a) a squeeze roller and a backing plate disposed with respect to said stuffing machine such that the squeeze roller may be brought together with the backing plate at a thermoplastic container bottom, and moved upwardly along the container outside, and then brought apart from said backing plate;

(b) a liquid delivery means attached to said stuffing machine for delivering liquid additive to said container inside;

whereby after said liquid additive is delivered inside said container, said squeeze roller and said backing plate are brought together at said container bottom, said squeeze roller is moved upwardly along said container outside, and then brought apart from said backing plate, thereby dispersing said liquid additive along the inside of the container to a desired level.

2. An apparatus comprising:

(A) a squeeze roller;

(B) a backing plate;

(C) a bag having a bottom and an open top;

(D) means for delivering liquid into the bag;

(E) means for bringing the squeeze roller against the bottom of the bag so that the bag is between and in contact with both the squeeze roller and the backing plate; and (F) means for moving the squeeze roller upwardly along the bag, while maintaining enough pressure on the bag so that an additive dispensed into said bag is dispersed over the inside of the bag.

* * * * *